Sept. 1, 1942.  G. VON PAZSICZKY  2,294,588

METHOD OF AND APPARATUS FOR PRODUCING GLASS FIBERS

Filed Nov. 6, 1939

INVENTOR
Gedeon von Pazsiczky,
BY
ATTORNEY

Patented Sept. 1, 1942

2,294,588

UNITED STATES PATENT OFFICE 2,294,588

METHOD OF AND APPARATUS FOR PRODUCING GLASS FIBERS

Gedeon von Pazsiczky, Hamburg-Wandsbek, Germany, vested in the Alien Property Custodian Application November 6, 1939, Serial No. 303,059
In Germany November 15, 1938

7 Claims. (Cl. 49—1)

The present invention relates to a method of and an apparatus for producing relatively fine fibers or filaments from molten glass, slag and other inorganic materials which are plastic when heated.

Heretofore various attempts have been made to produce glass fibers from molten glass utilizing centrifugal force as a factor in the attenuation of the fibers. Both the use of a perforated centrifugal drum and of a centrifugal disk have been resorted to for such a purpose and, from the point of view of the textile industry, satisfactory results have not been attained because of the inability of such devices to produce fibers that are fine enough for textile use. In particular, these known processes have the disadvantage that the centrifuging devices are too far removed from the source of molten glass so that the degree of fluidity of the glass is insufficient for attenuation of fine fibers. The relatively coarse fibers that are produced by such processes break easily and furthermore are accompanied by impurities such as globules of glass which hinder their use in textile machines.

The present invention is designed to overcome the limitations that are attendant upon apparatus of this type utilizing centrifugal force as an attenuating factor and toward this end contemplates the centrifuging of a rotating liquid mass of molten glass over the edge of a rotating weir, the liquid mass being drawn directly from a supply body of the glass in close proximity thereto. In this manner molten glass of a higher temperature than has heretofore been possible is available for attenuation of the fibers.

The provision of an apparatus of the character set forth above being the principal object of the invention, it is another object thereof to provide such an apparatus in which centrifugal force is utilized not only for attenuating the fibers from the rotating mass but is also utilized for elevating the glass to the level of the rotating weir in order that attenuation of the fibers may take place from the edge of the weir.

A further object of the invention is to provide an apparatus of this character in which the desired fluidity or viscosity of the glass may be insured by the use of a burner, the flame from which is directed against the surface of the rotating mass of molten glass in the vicinity of the region from which the fibers are attenuated.

It is another object of the invention, in a modified form thereof, to produce an attenuating apparatus in which the fibers are attenuated by centrifugal forces that act upon the same initially to throw the fibers radially outwardly with the fibers assuming in their movement a substantially spiral path, and in which additionally other centrifugal forces subsequently act upon the fibers to change their direction of movement and further attenuate the same with the fibers assuming movement in a reverse spiral direction.

Other objects and advantages of the invention, not at this time enumerated, will become apparent as the following description ensues.

In the accompanying single sheet of drawings.

Figure 1:
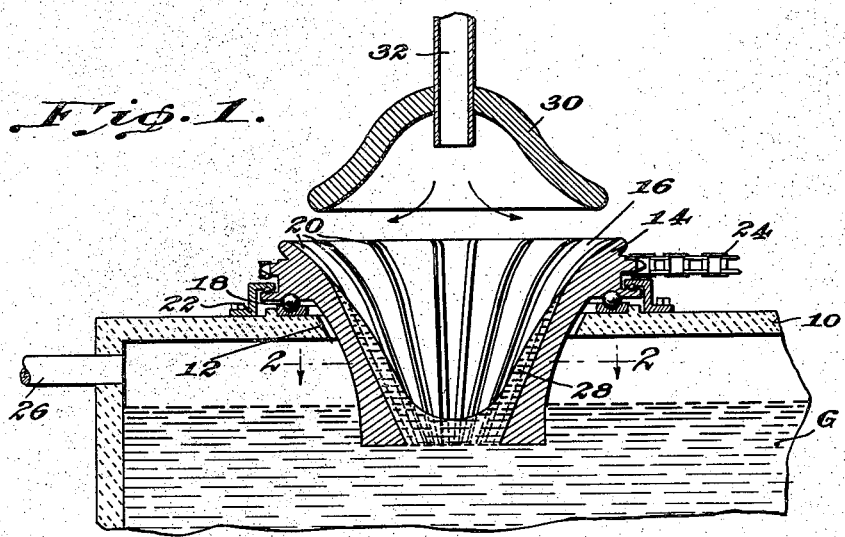
Fig. 1 is a vertical sectional view taken substantially centrally through a centrifugal attenuating apparatus constructed in accordance with the principles of the present invention.
Figure 2:
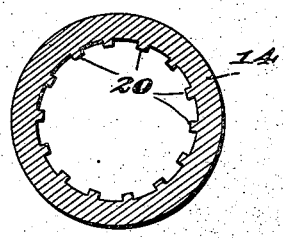
Fig. 2 is a sectional view taken substantially along the line 2—2 of Fig. 1.

Referring now to Fig. 1, a supply tank 10 adapted to contain a supply body G of molten glass is provided with an opening 12 in the top wall thereof. A funnel-shaped centrifuging member 14 the walls of which are flared outwardly as at 16 adjacent the upper edge thereof beyond the normal taper of the walls is rotatably mounted in the opening 12 on bearings 18 and the lower small end thereof extends below the level of the glass G in the tank 10. A series of spaced ribs 20 are formed on the inner tapered surface of the member 14 and extend from the bottom thereof to the upper edge thereof. A ring member 22 maintains the member 14 seated on the bearings 18 while a chain and sprocket mechanism 24 effects rotation of the member at relatively high speed.

Air introduced into the tank 10 from a conduit 26 serves to force the molten glass at least partially upwardly in the rotating member 14 while the centrifugal force acting upon the glass by virtue of the rotation of the former carries the glass upwardly in the form of a rotating cone as indicated at 28 in such a manner that the glass is flung radially outwardly over the upper edge of the member 14, which in effect constitutes a rotating weir, and the glass is thus attenuated and drawn into fine filaments which, when acted upon by the relatively quiescent air surrounding the member 14 causes the filaments to progress outwardly in spiral fashion. The attenuated fibers will build up in the form of a ring and they may be thus collected in this form.

A hood 30 overlies the member 14 and a burner 32 extending downwardly through the hood 30 applies a flame to the glass contained within the member 14 to maintain the same at a sufficiently high temperature that the glass will have the desired degree of viscosity for proper attenuation of fine fibers over the edge of the rotating weir.

It is to be noted that the main supply body of glass G within the tank 10 is relatively close to the region of attenuation and therefore the temperature drop in the glass prior to attenuation of fibers therefrom is no more than desired. However, any excessive temperature drop may be compensated for by the provision of the burner 32. In certain instances however the use of the burner 32 may be dispensed with. For these reasons the production of fibers of relatively small diameters is made possible.

Figure 3:
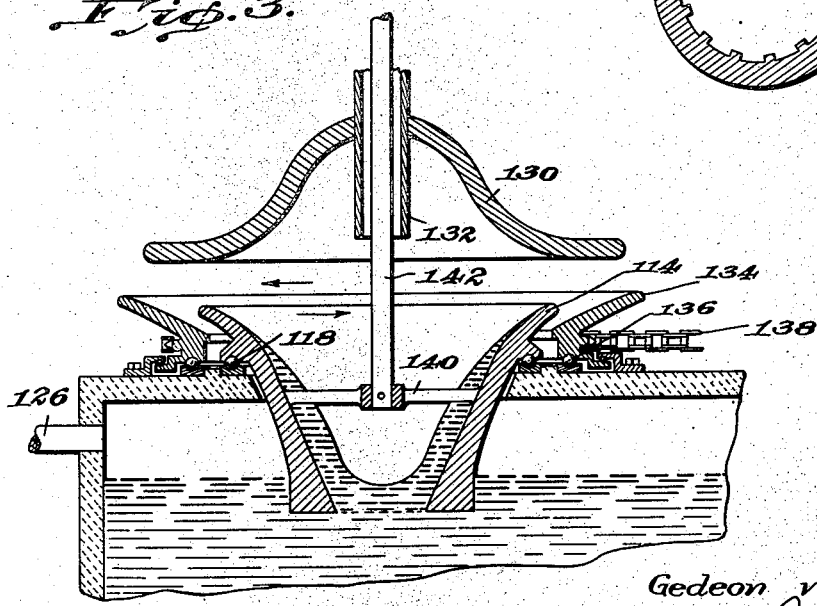
Fig. 3 is a sectional view similar to Fig. 1 showing a modified form of apparatus.

In Fig. 3 a modified form of construction is shown in which the central rotating centrifuging member 114 is surrounded by a second and concentric centrifuging member 134 mounted in bearings 136 and driven by means of a chain and sprocket mechanism 138 in a direction opposite to the direction of rotation of the central member 114. The central centrifuging member 114 is maintained seated upon its bearings 118 by means of a spider 140 connected to a vertical shaft 142 by means of which the member 114 is rotated. The shaft 142 extends through a sleeve 132 corresponding to the burner 32 and by means of which a jet of heated air may be directed against the glass which rises in the member 114 and which is thrown radially outwardly by centrifugal force over the upper edge of the latter.

A hood 130 is utilized for confining the heated air to the attenuating region while air introduced through the conduit 126 serves to force the glass upwardly into the rotating member 114.

It is to be noted that the elevation of the upper edge of the outer centrifuging member 134 is slightly above the level of the upper edge of the centrifuging member 114 and thus the filaments which are attenuated in a spiral direction from this latter edge are subsequently engaged by the former edge and are further attenuated in a spiral direction which is oppositely directed with respect to the first direction. In this manner, not only are fibers of very small diameters produced, but the surrounding circular region in which the fibers are collected is materially reduced in diameter.

Modifications may be resorted to within the spirit and scope of the appended claims.

I claim:

1. Apparatus for producing fibrous glass comprising a tank containing a pool of molten glass, a substantially vertically disposed centrifuging member open at its upper and lower ends and having an outwardly and upwardly tapered conical inner wall, means supporting the member for rotation about a vertical axis with its lower end submerged in the pool, means for rotating the member in one direction, a second centrifuging member surrounding the first member, said second member also having an outwardly and upwardly tapered conical inner wall terminating in an upper edge that is slightly higher than the upper end of the first centrifuging member, means supporting the second member for rotation about a vertical axis, and means for rotating the second member in a direction opposite to the direction of rotation of the first member.

2. The method of producing relatively fine filaments from molten glass which comprises establishing a stationary supply body of molten glass, causing a mass of molten glass to be drawn upwardly from the supply body and move by centrifugal force as a layer over the interior surface of a rotating open-ended vertically disposed hollow centrifuging member submerged partly in said supply body, while maintaining the continuity of said mass of molten glass with said supply body, and causing the layer of molten glass within the member to be reduced in thickness as it moves upwardly and be thrown outwardly from the upper edge of the member into the atmosphere to be thereby attenuated into fine fibers.

3. The method of producing relatively fine filaments from molten glass which comprises maintaining a stationary supply body of molten glass, causing a mass of molten glass to be drawn upwardly from the supply body and move by centrifugal force as a layer over the interior surface of a rotating open-ended vertically disposed hollow centrifuging member above said supply body and partly submerged therein, while maintaining the continuity of said mass of molten glass with said supply body, and causing the layer of molten glass within the member to be reduced in thickness as it moves upwardly and be thrown outwardly from the upper edge of the member into surrounding atmosphere while simultaneously applying heat to the mass of glass within the centrifuging member, thereby attenuating the glass into fine fibers.

4. Apparatus for producing fibrous glass comprising a tank adapted to contain a pool of molten glass, a vertically disposed centrifuging member provided with upper and lower open ends and having an outwardly and upwardly tapered annular inner wall, said wall having an increased outward taper at its upper end forming a flared portion and said wall terminating at the top of the member in an overflow edge, means for supporting the member rotatably about a vertical axis with its lower end submerged in the molten glass in the pool, and its top open to the atmosphere and means for rotating the member to cause the molten glass to move upwardly over the tapered annular surface and be accelerated by said flared portion and then thrown centrifugally from the upper edge of said member into surrounding atmosphere, thereby attenuating the glass into filaments.

5. Apparatus for producing fibrous glass comprising a tank containing a pool of molten glass, a vertically disposed centrifuging member having open top and bottom and an outwardly and upwardly tapered annular inner wall, said member terminating at the top thereof in an overflow edge, means supporting the member for rotation about a vertical axis with its top open to the atmosphere and its bottom submerged in the molten glass contained in the pool, and means for rotating the member to cause the molten glass to move progressively upwardly over the tapered wall and be thrown centrifugally from the overflow edge of the member into the atmosphere to thereby be formed into fibers.

6. Apparatus for producing fibrous glass comprising a tank containing a pool of molten glass, a vertically disposed cup-like centrifuging member having an open bottom and an outwardly and upwardly tapered annular inner wall, the top of said member being formed as an overflow edge, a series of ribs formed on said wall extending in a generally vertical direction and projecting inwardly from the wall, means supporting the member for rotation about a vertical axis with its bottom submerged in the molten glass contained in the pool and its top open to the atmosphere, and means for rotating the member to cause the molten glass to move progressively upwardly over the tapered wall and be thrown centrifugally from the overflow edge of the member.

7. Apparatus for producing fibrous glass comprising a tank containing a pool of molten glass, a vertically disposed open-ended centrifuging member having an outwardly and upwardly tapered annular inner wall, said member terminating at the top of the tapered wall in an overflow edge, means supporting the member for rotation about a vertical axis with its bottom submerged in the molten glass contained in the pool, means for rotating the member to cause the molten glass to move upwardly over the tapered wall and be thrown outwardly from the overflow edge of the member, a hood overlying the member and spaced from said edge, and a burner within the hood directed downwardly into the member for applying heat to the glass contained within the member.

GEDEON von PAZSICZKY.